[Patent 3,511,757 — May 12, 1970]

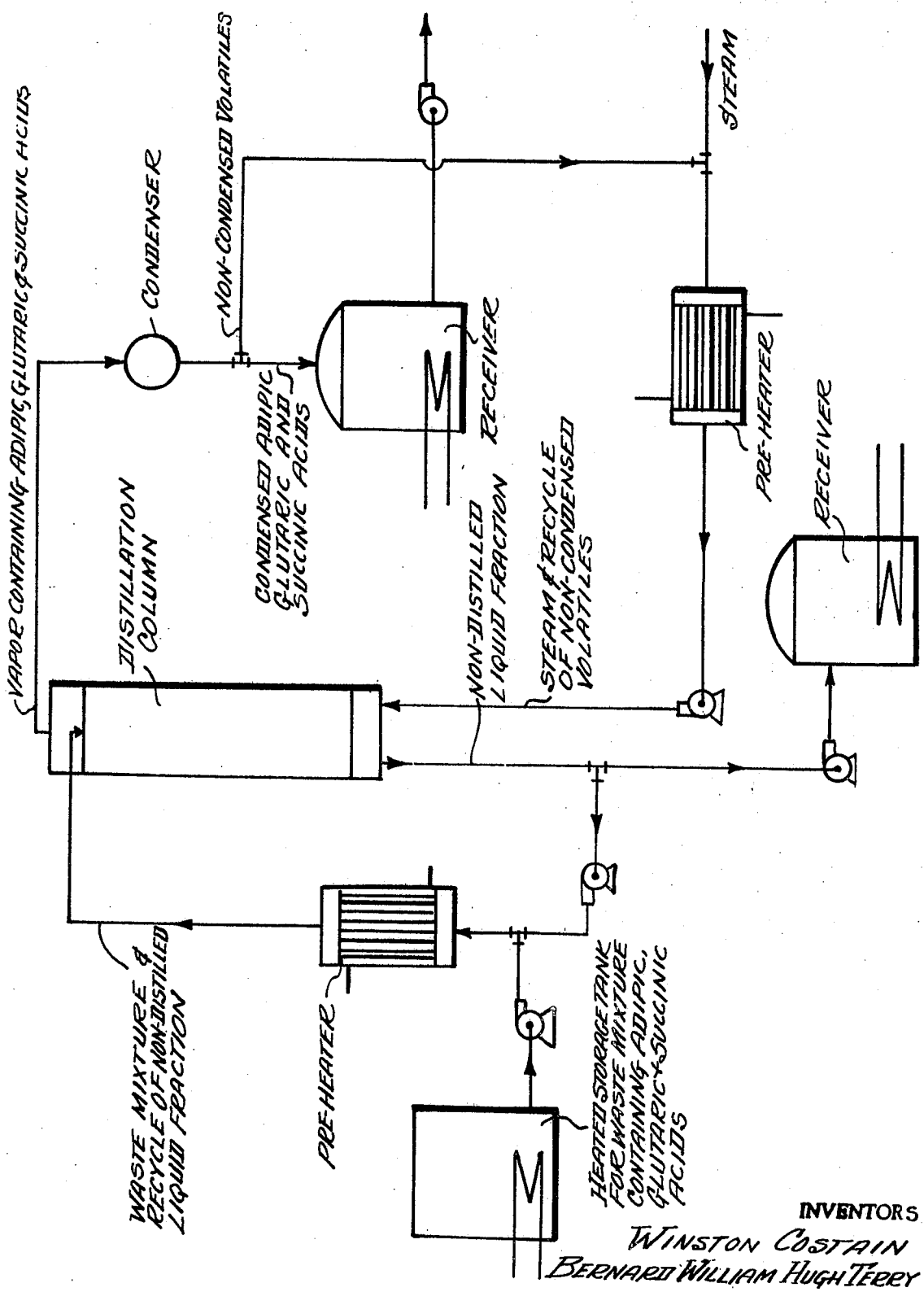

3,511,757
ATMOSPHERIC STEAM DISTILLATION OF ADIPIC ACID WASTE MIXTURE

Winston Costain and Bernard William Hugh Terry, Manchester, England, assignors to Imperial Chemical Industries Limited, London, England, a corporation of Great Britain
Filed Jan. 22, 1968, Ser. No. 699,347
Claims priority, application Great Britain, Feb. 22, 1967, 8,480/67
Int. Cl. B01d 3/34, 3/38
U.S. Cl. 203—96      5 Claims

ABSTRACT OF THE DISCLOSURE

Purification of "Nylon waste acids" i.e. a by-product obtained in adipic acid manufacture, by distilling in steam at substantially atmospheric pressure.

---

This invention relates to a process for the purification of mixtures of dibasic acids, particularly adipic, succinic and glutaric acids.

Adipic acid, an intermediate used in the manufacture of Nylon 66, is manufactured by oxidising with nitric acid mixtures of cyclohexanol and cyclohexanone obtained by oxidation of cyclohexane, the nitric acid oxidation being carried out in presence of a catalyst, for example a mixture of copper and vanadium salts. As a by-product of the process there is obtained a mixture of dicarboxylic acids known as "Nylon waste acids" by which term it is hereinafter indicated. This by-product consists mainly of adipic, glutaric and succinic acids and as isolated from the manufacturing process it is usually light brown in colour and contains a significant amount of impurities, for example nitrocompounds (e.g. picric acid) and copper, vanadium and iorn salts. Difficulties have hitherto been encountered in purifying "Nylon waste acids" economically because at temperatures above 180° C. adipic acid progressively decomposes, the rate of decomposition increasing as the temperature is raised until at its boiling point of 330° decomposition is quite rapid. These difficulties have hampered the utilisation of "Nylon waste acids" although certain outlets are possible, particularly in the plasticiser field.

It has now been found, quite surprisingly, that adipic acid and its homologues may be distilled in steam at atmospheric pressure without any substantial amount of decomposition, even though in the case of adipic acid the distillation temperature under these conditions is about 280° C. The stabilising effect of steam is all the more surprising since no stabilisation is achieved with carbon dioxide or nitrogen.

According to the invention therefore a process for the purification of "Nylon waste acids" comprises distilling said acids in steam at substantially atmospheric pressure to separate the mixture of acids from impurities which are not volatile in steam.

The term "substantially atmospheric pressure" is employed because in practice the pressure inside a steam distillation apparatus may be appreciably different from atmospheric, depending upon the characteristics of the vessel and the inlet pressure of the steam. In the process of the invention it is not necessary to depart deliberately from atmospheric pressure and in particular it is not necessary to reduce the pressure below atmospheric.

To attain the necessary distillation temperature it is convenient to employ superheated steam. During the distillation the melt temperature may usefully be increased. Preferred melt temperatures are not less than 250° C. at the commencement and not above 300° C. at the end of the distillation. At atmospheric pressure the melt temperature should preferably rise during the distillation from about 260° C. to about 290° C.

Distillation in our process is preferably carried out using a ratio of steam to "Nylon waste acids" which is between the limits of 0.5:1 and 5:1 by weight. At lower steam ratios there is some (though limited) decomposition of adipic acid, and at higher steam ratios isolation of the acids from the aqueous phase of the distillate becomes difficult. A ratio of 1:1 has been found entirely satisfactory in practice.

Purified "Nylon waste acids" may be isolated from the distillate obtained in the process of our invention by partial condensation to remove the acids therefrom in molten form. The remaining volatiles including steam may be condensed subsequently. Carry-over of dibasic acid with the more easily volatile material for example monobasic acids, may be minimised by a suitable disentrainment system.

The present invention is further explained by means of the accompanying drawing wherein a waste mixture containing adipic, glutaric and succinic acids is led from a heated storage tank to a distillation column to which is also introduced steam, and if desired a recycle stream of non-condensed materials separated from condensed vapor products of distillation. Prior to introduction into the distillation column, the waste mixture can be heated to the desired temperature in a pre-heater. Further, a portion of the distillation tailings can be recycled with the waste mixture and combined with the latter prior to introduction into the distillation column. The vapor product of the distillation operation is led to a conventional condenser wherein the adipic, glutaric and succinic acid values are condensed and removed as product in a receiver unit.

The liquid tailings from the distillation column, apart from any recycle values returned to the distillation column can be collected in a receiver and sent to waste, if desired.

Steam is also introduced into the distillation column in the amounts specified at substantially atmospheric pressure. The temperature of the steam is sufficiently high to effect distillation of the acids in the waste mixture and can, preferably, be heated prior to introduction into the distillation column in a pre-heater.

The invention is illustrated but not limited by the following example in which the parts are by weight.

EXAMPLE

Crude "Nylon waste acids" (200 parts) were distilled at atmospheric pressure with steam (280 parts per hour) at an internal melt temperature of 285° C. The distilled acids (187.5 parts) were condensed out of the vapour phase and held at 155° C. to remove residual moisture, the volatile components being subsequently condensed. The aqueous distillate (255 parts) was shown by paper chromatography to contain mixed disbasic acids but no mono-basic acids were detected. The mixed acids content, estimated by titration, was equivalent to 10.75 parts glutaric acid.

Analysis of typical mixtures was as follows:

Crude "Nylon waste acids"

Appearance—Light brown
Nitrobodies (est. as picric acid)—835 p.p.m.
Copper—2,100 p.p.m.
Vanadium—590 p.p.m.
Iron—20 p.p.m.

Steam distilled "Nylon waste acids"

Appearance—Off-white
Nitrobodies (est. aspicric acid)—90 p.p.m.
Copper—1 p.p.m.
Vanadium—15 p.p.m.
Iron—Less than 2 p.p.m.

We claim:
1. A process for purifying a waste mixture obtained in the manufacture of adipic acid by oxidizing with nitric acid a mixture of cyclohexanol and cyclohexanone obtained by oxidation of cyclohexane, said waste mixture consisting mainly of adipic, glutaric and succinic acids; the process comprising treating said waste mixture in molten form with steam at substantially atmospheric pressure and at a temperature sufficiently high to effect distillation of said acids in said steam, said temperature at the commencement of the distillation being not less than about 250° C.

2. Process according to claim 1 wherein the distillation is carried out at atmospheric pressure and the temperature of the molten waste mixture at the commencement of the distillation is about 260° C. and at the end is about 290° C.

3. Process according to claim 1 wherein distillation is carried out using a ratio of steam to waste mixture which is between the limits of 0.5:1 and 5:1 parts by weight.

4. Process according to claim 1 wherein distillation is carried out using a ratio of steam to waste mixture which is between the limits of 0.5:1 and 5:1 parts by weight.

5. Process according to claim 2 wherein distillation is carried out using a ratio of steam to waste mixture which is between the limits of 0.5:1 and 5:1 parts by weight.

References Cited

UNITED STATES PATENTS

| | | | |
|---|---|---|---|
| 2,703,331 | 3/1955 | Goldbeck et al. | 260—537 |
| 3,036,127 | 5/1962 | Chafetz | 260—537 |
| 3,180,878 | 4/1965 | Campbell et al. | 260—537 |
| 3,290,369 | 12/1966 | Bonfield et al. | 260—537 |
| 3,321,382 | 5/1967 | Ashcraft et al. | 203—96 |
| 3,354,056 | 11/1967 | Wegerich et al. | 203—79 |

WILBUR L. BASCOMB, Jr. Primary Examiner

U.S. Cl. X.R.

203—97; 260—537